(12) United States Patent
Vacaro et al.

(10) Patent No.: US 10,298,711 B2
(45) Date of Patent: May 21, 2019

(54) SERVICE FUNCTION CHAINS USING CORRELATION COOKIES

(71) Applicant: HEWLETT PACKARD ENTERPRISE DEVELOPMENT LP, Houston, TX (US)

(72) Inventors: Juliano Cardoso Vacaro, Porto Alegre (BR); Paul Allen Bottorff, Portola Valley, CA (US); Donald Fedyk, Andover, MA (US); Sebastien Tandel, Porto Alegre (BR); Dorian Conde Langbeck, Porto Alegre (BR)

(73) Assignee: Hewlett Packard Enterprise Development LP, Houston, TX (US)

( * ) Notice: Subject to any disclaimer, the term of this patent is extended or adjusted under 35 U.S.C. 154(b) by 48 days.

(21) Appl. No.: 15/619,295

(22) Filed: Jun. 9, 2017

(65) Prior Publication Data
US 2018/0359329 A1 Dec. 13, 2018

(51) Int. Cl.
| H04L 12/26 | (2006.01) |
| H04L 29/08 | (2006.01) |
| H04L 29/06 | (2006.01) |
| H04L 12/935 | (2013.01) |
| H04L 12/747 | (2013.01) |

(52) U.S. Cl.
CPC ...... *H04L 67/2804* (2013.01); *H04L 49/3009* (2013.01); *H04L 67/2819* (2013.01); *H04L 67/2842* (2013.01); *H04L 69/22* (2013.01); H04L 45/742 (2013.01); H04L 67/327 (2013.01)

(58) Field of Classification Search
CPC ..... H04L 12/24; H04L 12/741; H04L 12/911; H04L 12/939; H04L 29/06; H04L 41/0645; H04L 41/0659; H04L 45/28; H04L 45/745; H04L 47/746; H04L 49/3009; H04L 49/552; H04L 67/2814; H04L 67/2842; H04L 69/22; H04L 69/40
See application file for complete search history.

(56) References Cited

U.S. PATENT DOCUMENTS 9,203,765 B2 * 12/2015 Mestery ................. H04L 41/12
9,363,183 B2   6/2016 Kumar et al.
(Continued)

OTHER PUBLICATIONS

Kumbhare et al, Opendaylight Service Function Chaining Use-Cases, Ericsson, 25 pages, Oct. 2014.*
(Continued)

*Primary Examiner* — Frank Duong
(74) *Attorney, Agent, or Firm* — Mannava & Kang, P.C.

(57) ABSTRACT

According to examples, an apparatus may include a processor and a memory on which is stored machine readable instructions. The instructions may cause the processor to intercept a packet from a downstream service function classifier, in which the packet includes metadata that specifies an ordered set of service functions within a service function chain to be implemented on the packet, generate a correlation cookie that associates the packet with the service function chain, and encode the correlation cookie into the packet. The instructions may also cause the processor to store the correlation cookie and the metadata in a cache to correlate the correlation cookie and the metadata and send the packet with the encoded correlation cookie to the service function provider.

14 Claims, 5 Drawing Sheets

(56) References Cited

U.S. PATENT DOCUMENTS

| | | | | |
|---|---|---|---|---|
| 9,571,405 | B2* | 2/2017 | Pignataro | H04L 47/2441 |
| 2005/0289244 | A1* | 12/2005 | Sahu | H04L 67/2819 |
| | | | | 709/249 |
| 2014/0307710 | A1 | 10/2014 | Schindler | |
| 2015/0092551 | A1 | 4/2015 | Moisand et al. | |
| 2015/0124827 | A1 | 5/2015 | Rangaraman et al. | |
| 2016/0119253 | A1* | 4/2016 | Kang | H04L 67/2814 |
| | | | | 370/228 |
| 2017/0048815 | A1* | 2/2017 | Clarke | H04W 64/00 |
| 2017/0310611 | A1* | 10/2017 | Kumar | H04L 69/00 |
| 2017/0317926 | A1* | 11/2017 | Penno | H04L 45/26 |
| 2018/0041524 | A1* | 2/2018 | Reddy | H04L 63/1416 |

OTHER PUBLICATIONS

"SDN-NFV Reference Architecture," Feb. 2016, pp. 1-220, Version 1.0, Verizon, Available at: <innovation.verizon.com/content/dam/vic/PDF/Verizon_SDN-NFV_Reference_Architecture.pdf>.
Open Networking Foundation, "L4-L7 Service Function Chaining Solution Architecture", Version 1.0, Jun. 14, 2015, pp. 36.

* cited by examiner

SERVICE FUNCTION CHAINS USING CORRELATION COOKIES

BACKGROUND

In computer networks, proxy servers perform some service functions. Proxy servers are servers (or applications) that act as intermediaries for requests from clients seeking resources from other servers. A client may connect to a proxy server to request a service (e.g., a file, a connection, a web page, etc.), and the proxy server evaluates the request using a service function in order to simplify and control the complexity of the request. Typically, a connection is established from a client to the proxy server (downstream), and a second connection is established from the proxy server to the destination server (upstream). Load balancing and Secure Sockets Layer (SSL) offloading are example services that proxy servers offer.

BRIEF DESCRIPTION OF THE DRAWINGS

Features of the present disclosure are illustrated by way of example and not limited in the following figure(s), in which like numerals indicate like elements, in which.

DETAILED DESCRIPTION

A service function chain (SFC) is composed of an ordered set of service functions that are to be implemented on a packet. To establish a service function chain for a packet, a downstream service function classifier may insert data into the packet, e.g., into the header of the packet. The data may include chain forwarding data, e.g., chain forwarding addresses, hop identifiers, or the like. The data may also include metadata that specifies the ordered set of service functions within a SFC to be implemented on the packet. Generally speaking, the data inserted into the packet may be used by components in a network to send the packet from one hop to the next hop in the SFC. As such, if the data, such as the metadata, in the packet is not preserved as the packet is moved through the network, the SFC may be broken. When this occurs, the packet may need to be reclassified to reestablish the SFC. However, reclassification of the packet may introduce unacceptable network overhead in terms of additional processing time and resources on the packet.

Generally speaking, some service function providers, such as chaining un-aware proxy servers, do not carry the metadata in the packet from an ingress to an egress of the service function providers because these service function providers modify the flow identity of the packet from ingress to egress. That is, the service function providers may change the source IP address, the client IP address, the metadata, etc. As such, for instance, these service function providers may remove the metadata that specified the ordered set of service functions from the packet. The packet may thus need to be reclassified in order to reestablish the SFC for the packet as the SFC from the previous classification may not be known. A technical issue arising from conventional methods for processing packets according to a SFC may be that additional processing time and resources may be required to reestablish a SFC for a packet when a service function provider performs a service function on the packet that causes the metadata that specifies the ordered set of service functions within a SFC to be removed.

Disclosed herein are apparatuses and methods for implementing a chaining proxy that maintains the SFC for the packet even when a service function provider modifies the flow identity of the packet, e.g., removes the metadata that specifies the ordered set of service functions within a SFC. The apparatuses and methods disclosed herein may maintain a correlation between downstream paths and upstream paths from the service function providers that perform the service functions. That is, for instance, the apparatuses and methods disclosed herein may generate a correlation cookie that associates the packet with a SFC and may encode the correlation cookie into the packet prior to sending the packet to the service function provider. Information pertaining to the correlation cookie and the SFC may be stored such that when the packet is received again from the service function provider, the information pertaining to the correlation cookie and the SFC may be used to insert the metadata into the packet as the service function provider may have removed that metadata. The packet may then be forwarded to the next hop in a network as denoted by the metadata. Although TCP is an example transport that the apparatuses and methods may implement, it should be understood that the apparatuses and methods disclosed herein may implement other types of transports, such as the real-time transport protocol (RTP) family of transports, user datagram protocol (UDP) family of transports such as quick UDP (QUIC), and the like.

According to examples, technical solutions to the technical issue noted above are that packets need not be reclassified after service function providers, and particularly, chaining un-aware service function providers, have performed service functions on the packets. That is, through implementation of the apparatuses and methods disclosed herein, a SFC for the packets may be maintained without the network overhead required for reclassification of the packets. The apparatuses and methods disclosed herein may therefore reduce or eliminate the processing time and resources required to reclassify the packets after service function providers have performed service functions on the packets in order to reestablish the packet on a SFC. In addition, the SFC may be maintained without requiring modifications to the service function providers and thus the apparatuses and methods disclosed herein may be used with existing chaining systems, such as MAC Chaining, NSH, ConteXtream, etc.

Figure 1:
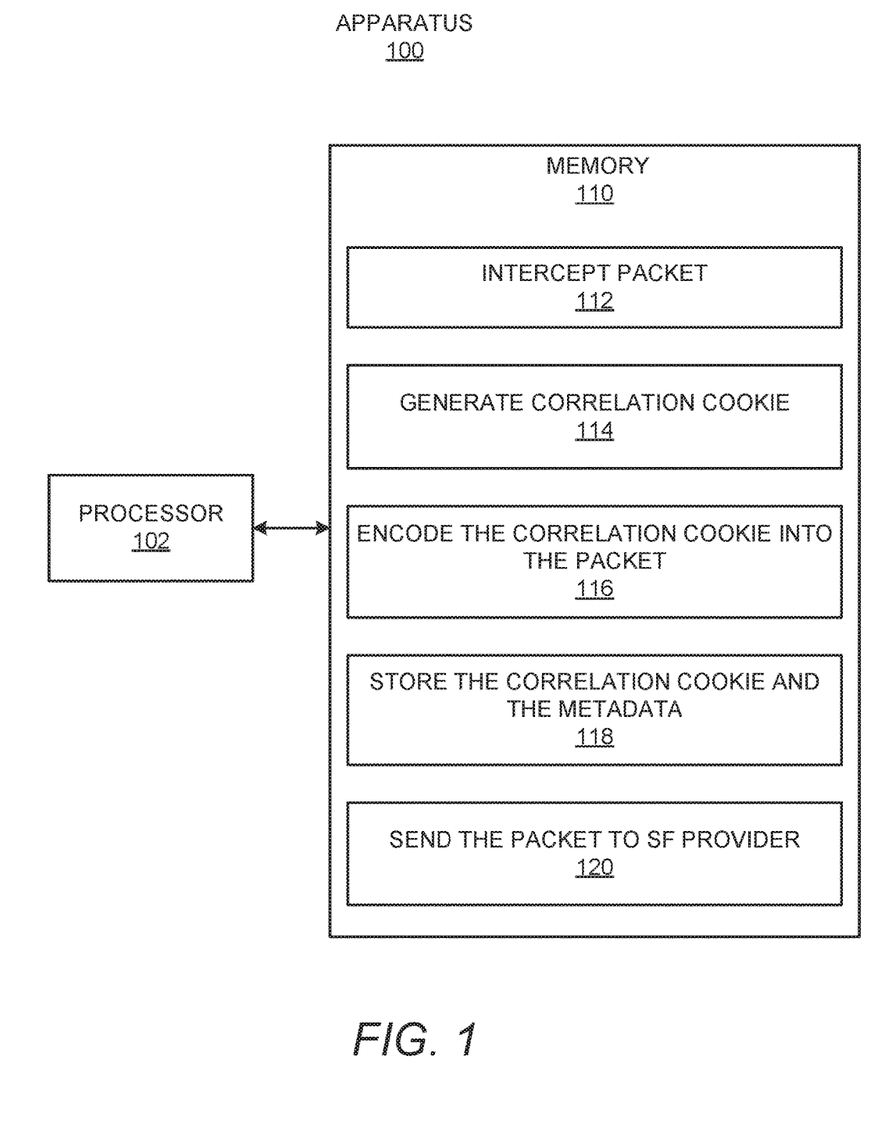
FIG. 1 shows a block diagram of an example apparatus that may implement service function chains using correlation cookies.

With reference first to FIG. 1, there is shown a block diagram of an example apparatus 100 that may implement service function chains using correlation cookies. It should be understood that the apparatus 100 depicted in FIG. 1 may include additional components and that some of the components described herein may be removed and/or modified without departing from a scope of the apparatus 100 disclosed herein.

The apparatus 100 may include a processor 102 that may control operations of the apparatus 100. The apparatus 100 may be a computing device such as a personal computer, a laptop computer, a smartphone, a server computer, a tablet computer, or the like. In a particular example, the apparatus 100 may be a single server or a cloud-based server. The processor 102 may be a semiconductor-based microprocessor, a central processing unit (CPU), an application specific integrated circuit (ASIC), a field-programmable gate array (FPGA), and/or other hardware device.

The apparatus 100 may also include a memory 110 that may have stored thereon machine readable instructions 112-120 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to intercept a packet as the packet is communicated between network components as discussed in greater detail below. The processor 102 may fetch, decode, and execute the instructions 114 to generate a correlation cookie that associates the intercepted packet with a service function chain. The processor 102 may fetch, decode, and execute the instructions 116 to encode the correlation cookie into the intercepted packet. The processor 102 may fetch, decode, and execute the instructions 118 to store the correlation cookie and metadata that specifies an ordered set of service functions within the service function chain on a cache to correlate the correlation cookie with the metadata. The processor 102 may also store chain forwarding data in the cache. The processor 102 may fetch, decode, and execute the instructions 120 to send an intercepted packet to a next hop or destination in the network.

Figure 2:
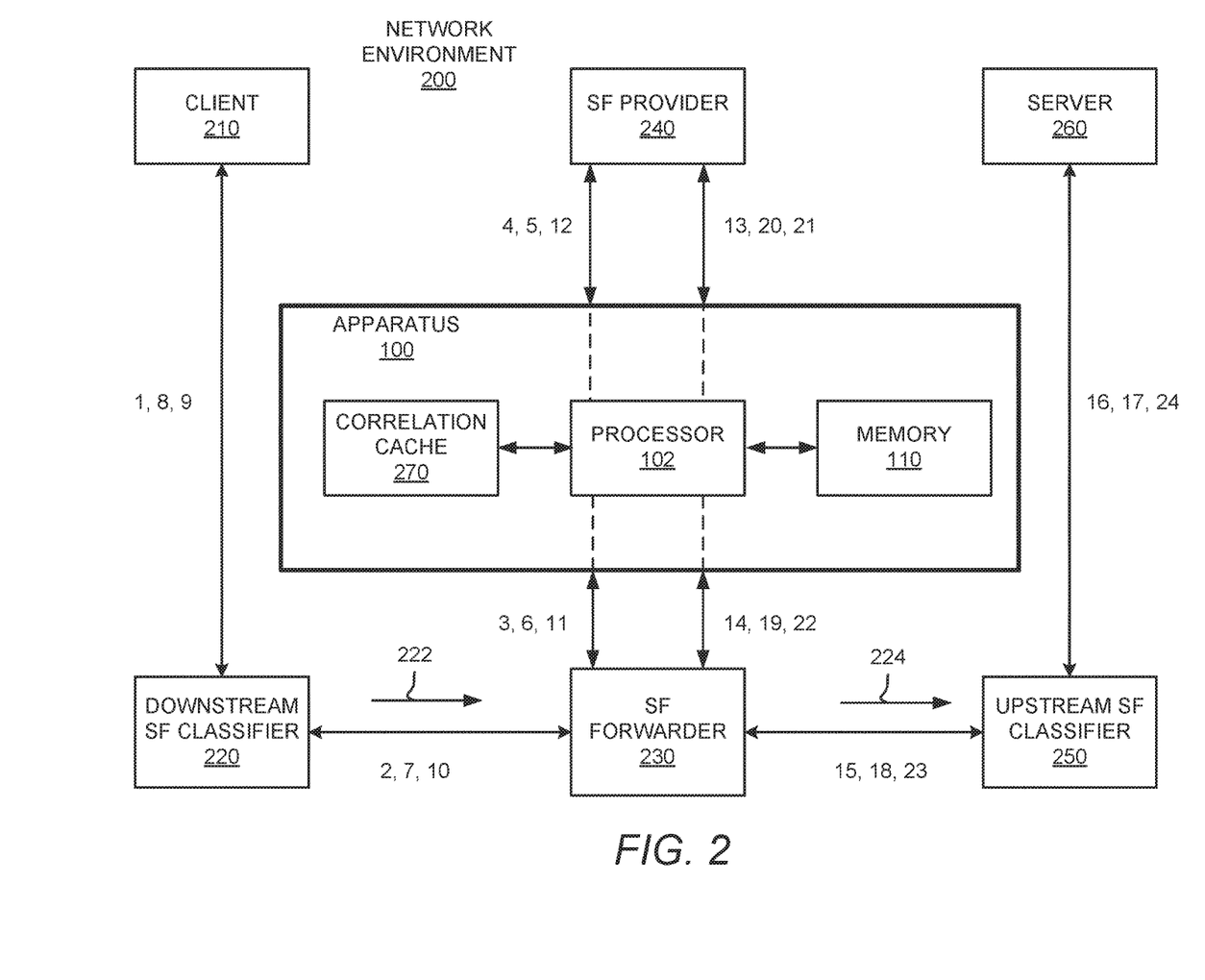
FIG. 2 shows a block diagram of an example network environment in which the apparatus depicted in FIG. 1 may be implemented.

With reference now to FIG. 2, there is shown a block diagram of an example network environment 200 in which the apparatus 100 depicted in FIG. 1 may be implemented. As shown, the network environment 200 may include a client 210, a downstream service function (SF) classifier 220, a service function (SF) forwarder 230, a service function (SF) provider 240, an upstream service function (SF) classifier 250, and a server 260. It should be understood that the network environment 200 depicted in FIG. 2 may include additional components and that some of the components described herein may be removed and/or modified without departing from a scope of the network environment 200 disclosed herein. For instance, the network environment 200 may include additional SF providers 240, servers 260, etc. Thus, although particular reference is made herein to a single SF provider 240 and a single server 260, it should be understood that packets may be delivered to multiple SF providers 240 and/or multiple servers 260 in a single service function chain.

As discussed herein, the SF provider 240 may be a proxy server and may perform various functions on packets in the network environment 200, such as load balancing, Secure Sockets Layer (SSL) offloading, and the like. The packets may thus be communicated to the SF provider 240 prior to being communicated to the server 260, which may perform other services on the packets. A service function chain may specify the order in which the packets are to be delivered to different components in the network environment 200. The service function chain may be specified in metadata that is inserted into the packet as the packet traverses the network environment 200.

Particularly, a client 210 may initiate a connection to the server 260 by issuing synchronization (SYN) packet and the downstream SF classifier 220 may intercept the SYN packet. The downstream SF classifier 220 may be a switch, access point, or other device in the network that may intercept packets originating from the client 210 that are directed to components in the network environment 200. In addition or in other examples, the downstream SF classifier 220 may be machine readable instructions stored on a network device. In any regard, the downstream SF classifier 220 may classify the SYN packet as being designated to traverse a particular service function chain. The downstream SF classifier 220 may classify the SYN packet based upon various factors such as, the server 260 to which the packet is destined, the client 210 from which the packet originated, policies to be enforced in the network environment 200, and/or the like.

In any regard, the downstream SF classifier 220 may insert the metadata into the intercepted packet and may forward the packet to the SF forwarder 230 in the downstream direction as denoted by the arrow 222. As used herein, the downstream direction 222 may be defined as a direction in which a packet flows toward the SF provider 240 and an upstream direction, which is denoted by the arrow 224, may be defined as a direction in which a packet flows away from the SF provider 240. In this regard, the terms "downstream" and "upstream" may be construed with respect to the SF provider 240.

The SF forwarder 230 may be a network device and/or machine readable instructions on the network device. In any regard, the SF forwarder 230 may review the metadata in the packet and may forward the packet based upon the metadata. For instance, the metadata may indicate that the packet is to undergo processing according to a particular service function chain in which the SF provider 240 is to process the packet prior to the server 260 processing the packet. In this regard, the SF forwarder 230 may forward the packet toward the SF provider 240 based upon the metadata.

As shown, the apparatus 100 may intercept the packet as the packet is being communicated toward the SF provider 240. For instance, the apparatus 100 may be a network device that is to intercept all of the packets communicated from the SF forwarder 230 to the SF provider 240. According to a particular example, the apparatus 100 may integral with the SF forwarder 230. In any regard, the processor 102 may execute the machine readable instructions 112-120 stored in the memory 110 to generate and insert a correlation cookie into the packet prior to forwarding the packet to the SF provider 240, store the metadata, store the correlation cookie, etc., in a correlation cache 270 as discussed in detail herein. As also discussed herein, the SF provider 240 may modify the flow identify of the packet, which may result in the metadata being removed from the packet in addition to the source IP address and/or the destination IP address being modified. Following processing of the packet, the SF provider 240 may forward the packet back to the SF forwarder 230.

The apparatus 100 may again intercept the packet communicated from the SF provider 240 to the SF forwarder 230. In addition, the processor 102 may restore the metadata in the packet to thus restore the service function chain for the packet. The processor 102 may also replace a source IP address and/or a destination IP address in the packet depending upon whether the packet is a synchronization (SYN) packet, a synchronization/acknowledgement (SYN/ACK) packet, an ACK packet, a SF provider SYN packet, a SF provider SYN/ACK packet, or a SF ACK packet as discussed in greater detail herein. The processor 102 may also forward the packet to the SF forwarder 230 and the SF forwarder 230 may forward the packet to downstream SF classifier 220 or the upstream SF classifier 250 depending upon the type of the packet as also discussed in greater detail herein.

In an example in which the SF forwarder 230 sends the packet to the server 260 in the upstream direction 224, the upstream SF classifier 250 may intercept the packet. The upstream SF classifier 250 may also remove the metadata from the packet prior to forwarding the packet to the server 260. The server 260 may also process the packet.

The numbers 1-24 depicted in FIG. 2 pertain to different operations performed on packets as the packets traverse the network environment 200 and are shown in parentheses and described in detail below with respect to the flow diagrams 300-500.

Figure 3:
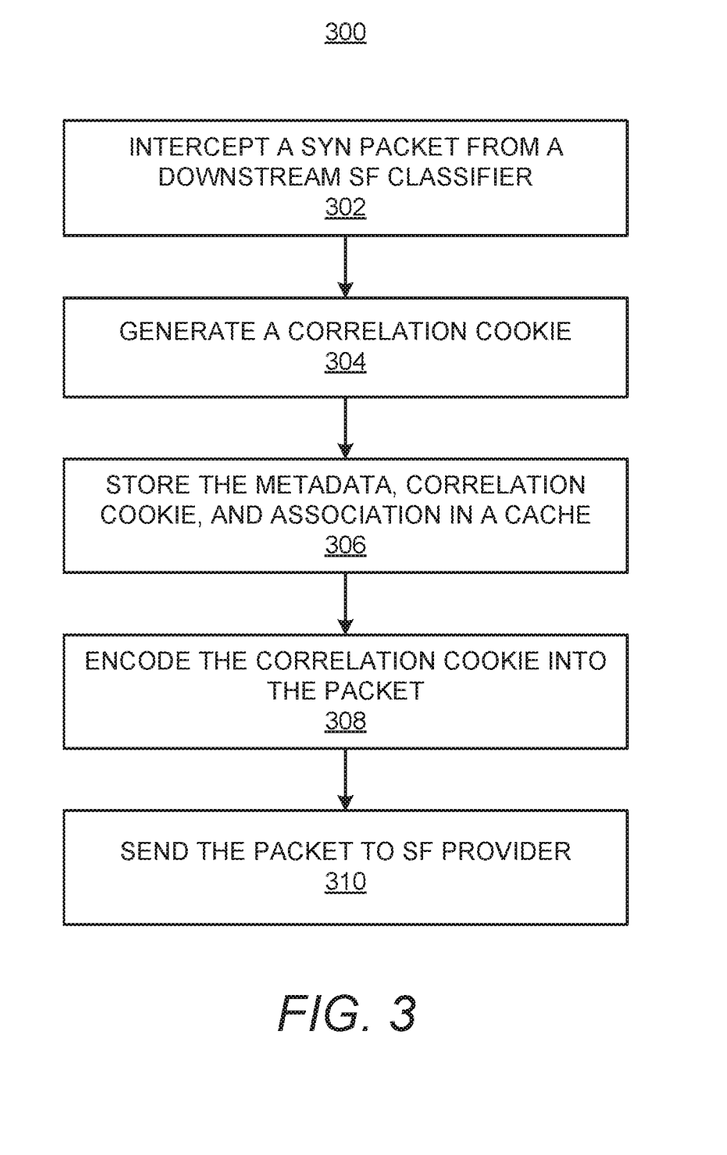
FIGS. 3-5, respectively, depicted flow diagrams of example methods for implementing service function chains using correlation cookies.
Figure 4:
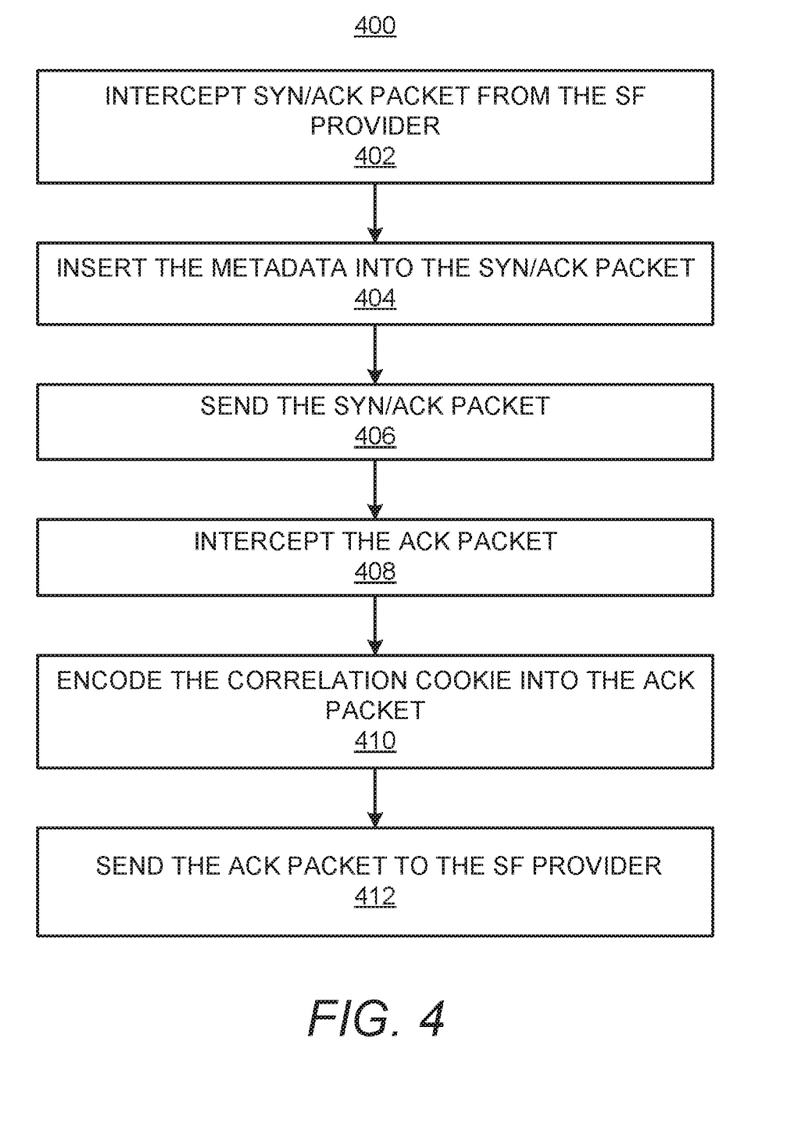
Figure 5:
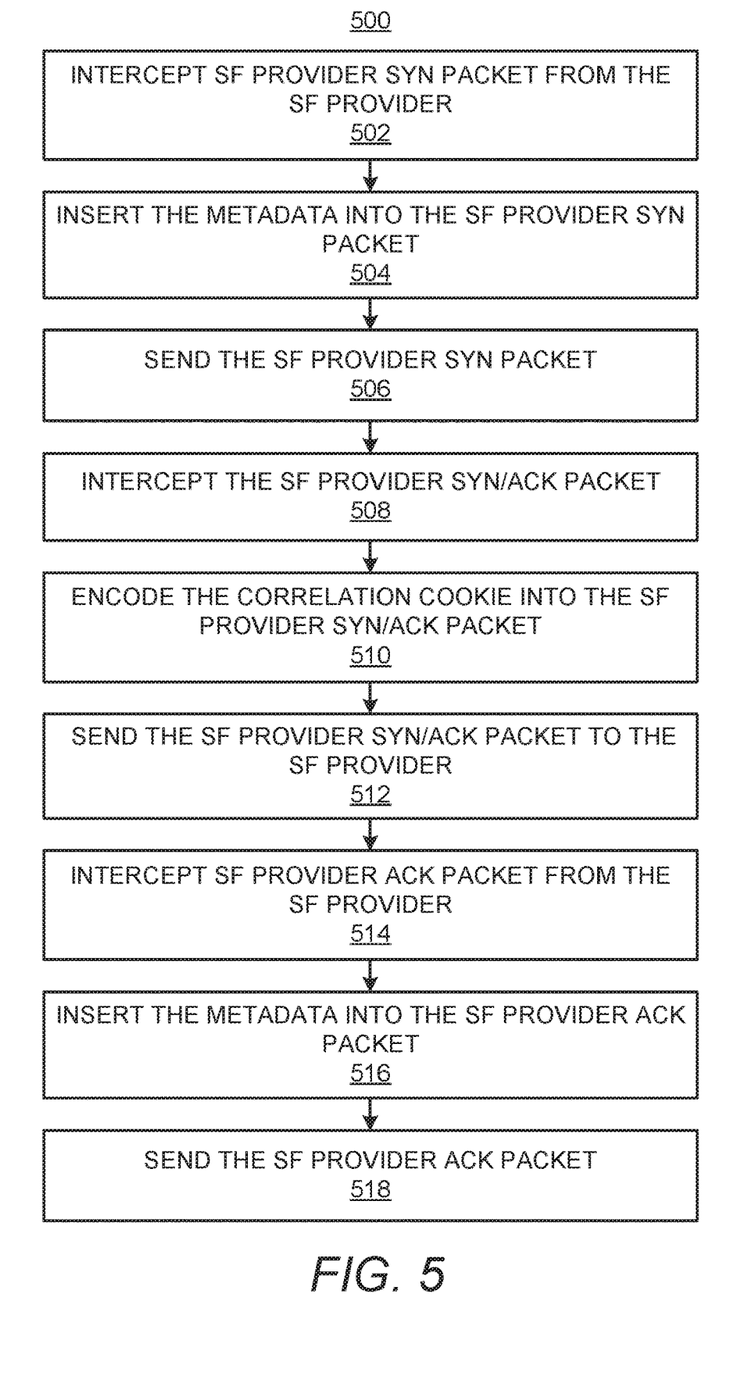

Various manners in which the apparatus 100, and particularly, the processor 110, may be implemented are discussed in greater detail with respect to the methods 300-500 respectively depicted in FIGS. 3-5. Particularly, FIGS. 3-5, respectively, depict flow diagrams of example methods 300-500 for implementing service function chains using correlation cookies. It should be understood that the methods 300-500 depicted in FIGS. 3-5 may include additional operations and that some of the operations described therein may be removed and/or modified without departing from the scopes of the methods 300-500. The descriptions of the methods 300-500 are made with reference to the features depicted in FIGS. 1 and 2 for purposes of illustration.

Additionally, the methods 300-500 are made with reference to the following table, which depicts an example of values contained in packets during various stages at which the packets traverse a network environment 200. The numbers "#" in the following table correspond to the numbers 1-24 depicted in FIG. 2 and the numbers recited in parentheses in below with respect to the methods 300-500. In addition, in the following table, "ip-src" corresponds to a source IP address, "ip-dst" corresponds to a destination IP address, "tcp-src" corresponds to a source TCP address, "tcp-dst" corresponds to a destination TCP address, "tcp-flags" correspond to TCP flags, and "metadata" corresponds to the value of the metadata corresponding to a service function chain. The following table also indicates how the IP address, the TCP addresses, the TCP flags, and the metadata may be modified as the packet is moved through the network environment 200.

| # | ip-src | ip-dst | tcp-src | tcp-dst | tcp-flags | metadata |
|---|--------|--------|---------|---------|-----------|----------|
| 1 | client | server | client | server | SYN | null |
| 2 | client | server | client | server | SYN | metal |
| 3 | client | server | client | server | SYN | metal |
| 4 | cookie | server | client | server | SYN | metal |
| 5 | server | cookie | server | client | SYN/ACK | null |
| 6 | server | client | server | client | SYN/ACK | metal |
| 7 | server | client | server | client | SYN/ACK | metal |
| 8 | server | client | server | client | SYN/ACK | null |
| 9 | client | server | client | server | ACK | null |
| 10 | client | server | client | server | ACK | metal |
| 11 | client | server | client | server | ACK | metal |
| 12 | cookie | server | client | server | ACK | metal |
| 13 | cookie | server | proxy | server | SYN | null |
| 14 | client | server | proxy | server | SYN | metal |
| 15 | client | server | proxy | server | SYN | metal |
| 16 | client | server | proxy | server | SYN | null |
| 17 | server | client | server | proxy | SYN/ACK | null |
| 18 | server | client | server | proxy | SYN/ACK | metal |
| 19 | server | client | server | proxy | SYN/ACK | metal |
| 20 | server | cookie | server | proxy | SYN/ACK | metal |
| 21 | cookie | server | proxy | server | ACK | null |
| 22 | client | server | proxy | server | ACK | metal |
| 23 | client | server | proxy | server | ACK | metal |
| 24 | client | server | proxy | server | ACK | null |

With reference first to FIG. 3, at block 302, the processor 102 may execute the instructions 112 to intercept a client-initiated SYN packet from a downstream SF classifier 220. The TCP-flag in the packet may be set to SYN as noted in the table above. At (1), the client 210 may have initiated the client-initiated SYN packet, which may identify the IP address of the server 260 as the destination IP address. At (2), the downstream SF classifier 220 may have intercepted the SYN packet and have added into the header of the SYN packet, metadata that specifies an ordered set of service functions with a service function chain to which the SYN packet is to be a part as noted above. In addition, at (2), the downstream SF classifier 220 may have forwarded the SYN packet, which may also be a TCP SYN packet, to the SF forwarder 230. At (3), the SF forwarder 230 may have forwarded the SYN packet to the SF provider 240. The metadata is listed as "metal" in the table above.

At block 304, the processor 102 may execute the instructions 114 to generate a correlation cookie, which associates the SYN packet with the service function chain. That is, the processor 102 may generate a correlation cookie that associates the packet with the service function chain as identified in the metadata contained in the packet. In any regard, the processor 102 may generate the correlation cookie through selection of the correlation cookie as a value from a pool of candidate correlation cookies, through generation of the correlation cookie as a sequential value from a subnet range, through computing of the correlation cookie as a hash value from a connection tuple, as a random value, or the like. In some examples, the correlation cookie may be an IP address of the apparatus 100.

At block 306, the processor 102 may execute the instructions 118 to store the metadata, the correlation cookie, and an association between the metadata and the correlation cookie in a correlation cache 270. For instance, the processor 102 may store the metadata, the correlation cookie, and an association between the metadata and the correlation cookie into a table in the correlation cache 270. The processor 102 may also access chain forwarding data from the packet and may store the chain forwarding data in the correlation cache 270.

At block 308, the processor 102 may execute the instructions 116 to encode the correlation cookie into the SYN packet. That is, the processor 102 may replace the client IP address in the source IP address of the packet with the correlation cookie as noted in number 4 in the table above. The processor 102 may also store the client IP address in the correlation cache 270.

At block 310, the processor 102 may execute the instructions 120 to send the SYN packet with the encoded correlation cookie to the SF provider 240. Thus, for instance, at (4), the SYN packet that is sent to the SF provider 240 may include, as the source IP address, the correlation cookie.

As noted above, the SF provider 240 may modify the flow identify of the SYN packet between an ingress and an egress of the SF provider 240. Following receipt of the SYN packet, the SF provider 240 may change the TCP-flag in the packet to SYN/ACK and may replace the source IP address with the server IP address and the destination IP address with the correlation cookie. Modification of the flow identity may involve removing the metadata from the packet without modifying the addresses in the packet header. Without the metadata in the packet header, the service function chain to which the packet is a member may not be identified and the service function chain for the packet may be lost. One way to restore the service function chain is to reclassify the packet; however, as noted above, this may require unwanted additional network overhead. Instead of reclassifying the packet, as discussed herein, the correlation cookie that was added to the packet may be used to reestablish the service function chain following processing of the packet by the SF provider 240.

Turning now to FIG. 4, the method 400 may depict operations that the processor 110 may implement following block 310 in FIG. 3. That is, the method 400 may depict operations following communication of the SYN/ACK packet (e.g., the packet with the TCP-flag set to SYN/ACK) from the SF provider 240 to the client 210 at (5).

At block 402, the processor 110 may execute the instructions 112 to intercept the SYN/ACK packet. In the SYN/ACK packet, the source IP address field may list the correlation cookie instead of the client IP address as the processor 110 may have replaced the client IP address with the correlation cookie at block 308 (FIG. 3). In addition, the SYN/ACK packet may not include the metadata as the SF provider 240 may have removed the metadata as also discussed above.

At block 404, the processor 110 may insert the metadata into the SYN/ACK packet. Through insertion of the metadata back into the SYN/ACK packet, the service function chain to which the SYN/ACK packet is a member may be reestablished.

At block 406, the processor 102 may send the SYN/ACK packet for delivery to the client 210. This may include forwarding the SYN/ACK packet to the SF forwarder 230 as noted at (6) and the SF forwarder 230 forwarding the SYN/ACK packet to the downstream SF classifier 220 at (7). The downstream SF classifier 220 may remove the metadata from the SYN/ACK packet and may send the SYN/ACK packet to the client 210 at (8). In addition, the client 210 may send back a final ACK packet to the server 260 at (9), which the downstream SF classifier 220 may intercept. The TCP-flag in the final ACK packet may be set to ACK. The downstream SF classifier 220 may insert the metadata into the ACK packet and may send the ACK packet with the metadata to the SF forwarder 230 at (10). The SF forwarder 230 may forward the ACK packet to the SF provider 240 at (11).

At block 408, the processor 102 may execute the instructions 112 to intercept the ACK packet. At block 410, the processor 102 may also execute the instructions 116 to encode the correlation cookie into the ACK packet, e.g., replace the client IP address listed in the source IP address field with the correlation cookie. In addition, at block 412, the processor 102 may execute the instructions 120 to send the ACK packet to the SF provider 240 (12). Following block 412, the downstream connection between the client 210 and the SF provider 240 may be established.

Turning now to FIG. 5, the method 500 may depict operations that the processor 110 may implement following block 412 in FIG. 4. That is, following receipt of the ACK packet, the SF provider 240 may send a SF provider SYN packet that is directed to the server 260 at (13). In the SF provider SYN packet, the TCP-flag may be set to SYN. For reasons similar to those presented above, the SF provider 240 may modify the flow identify of the SF provider SYN packet between an ingress and an egress of the SF provider 240.

At block 502, the processor 102 may execute the instructions 112 to intercept the SF provider SYN packet from the SF provider 240. In the SF provider SYN packet, the source IP address field may list the correlation cookie instead of the client IP address as the processor 110 may have replaced the client IP address with the correlation cookie at block 410. In addition, the SF provider SYN packet may not include the metadata as the SF provider 240 may have removed the metadata as also discussed above.

At block 504, the processor 110 may insert the metadata into the SF provider SYN packet. Through insertion of the metadata into the SF provider SYN packet, the service function chain to which the SF provider SYN packet is a member may be reestablished. In this regard, the correlation cookie may pass through the SF provider 240 and the processor 110 may use the correlation cookie to insert the metadata into the SF provider SYN packet.

At block 506, the processor 102 may send the SF provider SYN packet for delivery to the server 260. This may include forwarding the SF provider SYN packet to the SF forwarder 230 as noted at (14) and the SF forwarder 230 forwarding the SF provider SYN packet to the upstream SF classifier 250 at (15). The upstream SF classifier 250 may remove the metadata from the SF provider SYN packet and may send the SF provider SYN packet to the server 260 at (16). In addition, the server 260 may return an SF provider SYN/ACK packet to the SF provider 240 at (17), which the upstream SF classifier 250 may intercept. In the SF provider SYN/ACK, the TCP-flag may be set to SYN/ACK. The upstream SF classifier 250 may insert the metadata into the SF provider SYN/ACK packet and may send the SF provider SYN/ACK packet with the metadata to the SF forwarder 230 at (18). The SF forwarder 230 may forward the SF provider SYN/ACK packet to the SF provider 240 at (19).

At block 508, the processor 102 may execute the instructions 112 to intercept the SF provider SYN/ACK packet. At block 510, the processor 102 may also execute the instructions 116 to encode the correlation cookie into the SF provider SYN/ACK packet, e.g., replace the client IP address listed in the destination IP address field with the correlation cookie. In addition, at block 512, the processor 102 may execute the instructions 120 to send the SF provider SYN/ACK packet to the SF provider 240 (20). Following receipt of the SF provider SYN/ACK packet, the SF provider 240 may generate a SF provider ACK packet in which the SF provider 240 may replace the source IP address with the correlation cookie and the destination IP address with the server IP address. The SF provider 240 may also send the SF provider ACK packet to the server 260 at (21). In the SF provider ACK packet, the TCP-flag may be set to ACK.

At block, 514, the processor 102 may execute the instructions 112 to intercept the SF provider ACK packet from the SF provider 240. In the SF provider ACK packet, the source IP address field may list the correlation cookie instead of the client IP address as the processor 110 may have replaced the client IP address with the correlation cookie at block 410. In addition, the SF provider ACK packet may not include the metadata as the SF provider 240 may have removed the metadata as also discussed above.

At block 516, the processor 110 may insert the metadata into the SF provider ACK packet. Through insertion of the metadata into the SF provider ACK packet, the service function chain to which the SF provider ACK packet is a member may be reestablished. In this regard, the correlation cookie may pass through the SF provider 240 and the processor 110 may use the correlation cookie to insert the metadata into the SF provider ACK packet.

At block 518, the processor 102 may send the SF provider ACK packet for delivery to the server 260. This may include forwarding the SF provider ACK packet to the SF forwarder 230 as noted at (22) and the SF forwarder 230 forwarding the SF provider ACK packet to the upstream SF classifier 250 at (23). The upstream SF classifier 250 may remove the metadata from the SF provider ACK packet and may send the SF provider ACK packet to the server 260 at (24). Following block 518, the upstream connection between the SF provider 240 and the server 260 may be established.

Through implementation of the method 300-500, the downstream connection between the client 210 and the SF provider 240 and the upstream connection between the SF provider 240 and the server 260 may be established. In addition, the upstream connection and the downstream connection may be correlated with each other, e.g., may be included in a common service function chain. For instance, the metadata that specifies the service function chain may be restored after the metadata is removed. In this regard, the service function chain for a packet may be maintained without requiring reclassification of the packet.

Some or all of the operations set forth in the methods 300-500 may be contained as utilities, programs, or subprograms, in any desired computer accessible medium. In addition, the methods 300-500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    a processor; and
    a memory on which is stored machine readable instructions that when executed by the processor cause the processor to:
        intercept a packet from a downstream service function classifier, wherein the packet includes metadata that specifies an ordered set of service functions within a service function chain to be implemented on the packet;
        generate a correlation cookie that associates the packet with the service function chain;
        encode the correlation cookie into the packet;
        store the correlation cookie and the metadata in a cache to correlate the correlation cookie and the metadata;
        send the packet with the encoded correlation cookie to the service function provider;
        intercept the packet transmitted from the service function provider, wherein the metadata has been removed from the packet;
        restore the metadata to the packet by matching the correlation cookie to corresponding metadata in the cache and inserting the corresponding metadata from the cache into the packet; and
        send the packet to a next destination as specified by the metadata.

2. The apparatus according to claim 1, wherein the correlation cookie is any of:
    a value selected from a pool;
    a value generated sequentially from a subnet range;
    a random value; and
    a hash value calculated based on a connection tuple.

3. The apparatus according to claim 1, wherein the packet includes a source IP address, and wherein to encode the correlation cookie into the packet, the instructions are further to cause the processor to encode the correlation cookie as the source IP address of the packet.

4. The apparatus according to claim 1, wherein the packet includes chain forwarding data prior to the packet being sent to the service function provider and wherein the instructions are further to cause the processor to:
    store the chain forwarding data prior to sending the packet to the service function provider; and
    restore the chain forwarding data in the packet following receipt of the packet from the service function provider, wherein the chain forwarding data was modified by the service function provider.

5. The apparatus according to claim 4, wherein the packet includes a client IP address prior to the packet being sent to the service function provider and wherein the instructions are further to cause the processor to:
    store the client IP address prior to sending the packet to the service function provider; and
    restore the client IP address in the packet following receipt of the packet from the service function provider.

6. The apparatus according to claim 1, wherein the instructions are further to cause the processor to:
    intercept the packet from an upstream service function classifier, wherein the packet includes the metadata;
    encode the correlation cookie into the packet; and
    send the packet with the encoded correlation cookie to the service function provider.

7. The apparatus according to claim 6, wherein the instructions are further to cause the processor to:
    intercept the packet from the service function provider, wherein the metadata was removed from the packet;
    restore the metadata in the packet; and
    pass the packet to the downstream service function classifier.

8. The apparatus according to claim 7, wherein the packet includes a client IP address and wherein the instructions are further to cause the processor to:
    encode the correlation cookie as the client IP address prior to sending the packet to the service function provider; and
    replace the correlation cookie with the client IP address prior to passing the packet to the downstream service function classifier.

9. A method comprising:
    intercepting a client-initiated synchronize (SYN) packet from a downstream service function classifier, wherein the SYN packet includes metadata that specifies an ordered set of service functions within a service function chain with which the SYN packet is a member;
    generating, by a processor, a correlation cookie that associates the SYN packet with the service function chain;
    storing, by the processor, the metadata, the correlation cookie, and an association between the metadata and the correlation cookie in a cache;

encoding, by the processor, the correlation cookie into the SYN packet;

sending, by the processor, the SYN packet with the encoded correlation cookie to the service function provider;

intercepting a synchronize/acknowledgement (SYN/ACK) packet from the service function provider, wherein the SYN/ACK packet does not include the metadata;

inserting the metadata into the SYN/ACK packet by matching the correlation cookie to corresponding metadata in the cache and inserting the corresponding metadata from the cache into the SYN/ACK packet; and sending the SYN/ACK packet for delivery to a client.

10. The method according to claim 9, further comprising:

intercepting an ACK packet originating from the client;

restoring the correlation cookie into the packet; and sending the ACK packet to the service function provider.

11. The method according to claim 10, further comprising:

intercepting a service function provider SYN packet from the service function provider, wherein the service function provider SYN packet does not include the metadata;

inserting the metadata into the service function provider SYN packet;

sending the service function provider SYN packet for delivery to a destination;

intercepting a service function provider SYN/ACK packet corresponding to the service function provider SYN packet and originating from the destination;

restoring the correlation cookie into the service function provider SYN/ACK packet; and sending the service function provider SYN/ACK packet with the correlation cookie to the service function provider.

12. The method according to claim 11, the method further comprising:

replacing a client IP address in the service function provider SYN/ACK packet with the correlation cookie prior to sending the service function provider SYN/ACK packet to the service function provider;

intercepting a service function provider ACK packet from the service function provider;

replacing the correlation cookie with the client IP address in the service function provider ACK packet; and sending the service function provider ACK packet to the service function provider.

13. A non-transitory computer readable medium on which is stored machine readable instructions that when executed by a processor, cause the processor to:

intercept a packet from a downstream service function classifier, wherein the packet includes metadata that specifies an ordered set of service functions within a service function chain to be implemented on the packet;

generate a correlation cookie that associates the packet with the service function chain;

replace a source IP address in the packet with the correlation cookie;

store the correlation cookie, the metadata, the source IP address, and the service function chain in a cache;

send the packet with the encoded correlation cookie to the service function provider;

intercept the packet from the service function provider, wherein the metadata was removed from the packet;

replace the correlation cookie with the client IP address in the packet;

restore the metadata in the packet by matching the correlation cookie to corresponding metadata in the cache and inserting the corresponding metadata from the cache into the packet; and send the packet to a next destination as specified by the metadata.

14. The non-transitory computer readable medium according to claim 13, wherein the machine readable instructions are further to cause the processor to:

intercept the packet from an upstream service function classifier, wherein the packet includes the metadata;

encode the correlation cookie into the packet; and send the packet with the encoded correlation cookie to the service function provider.

* * * * *